J. W. GAMBLE.
DEVICE FOR SEPARATING LIQUIDS OR SOLIDS FROM GASES.
APPLICATION FILED DEC. 27, 1907.
982,488.
Patented Jan. 24, 1911.
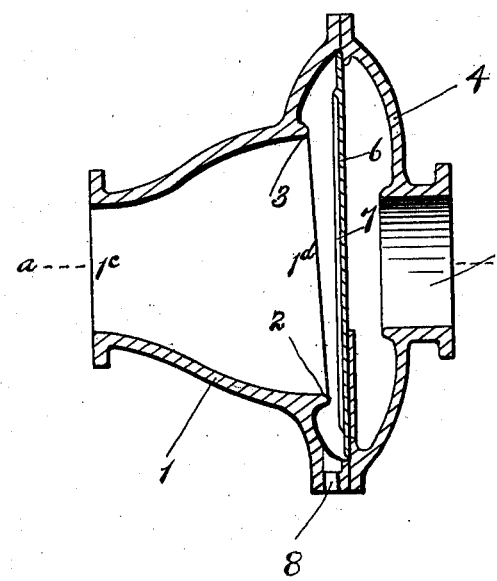
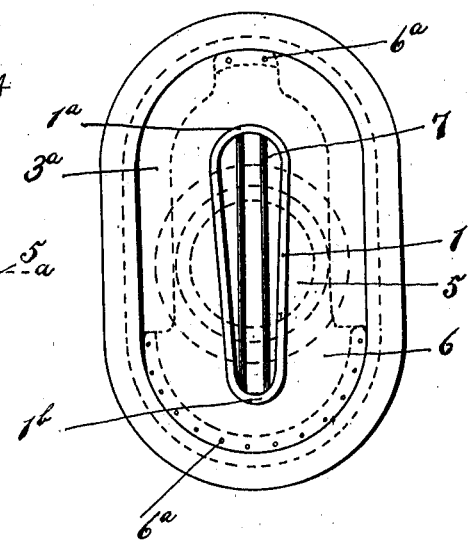
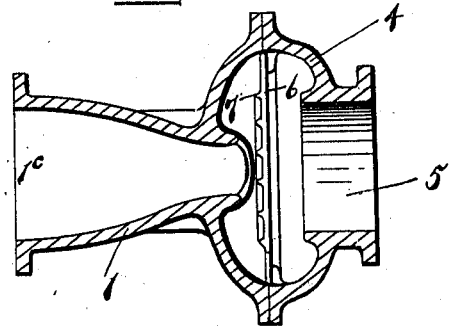

UNITED STATES PATENT OFFICE.

JOSEPH WILLARD GAMBLE, OF PHILADELPHIA, PENNSYLVANIA, ASSIGNOR TO JOSEPH S. LOVERING WHARTON, WILLIAM S. HALLOWELL, AND JOHN C. JONES, DOING BUSINESS UNDER THE FIRM-NAME OF HARRISON SAFETY BOILER WORKS, OF PHILADELPHIA, PENNSYLVANIA.

DEVICE FOR SEPARATING LIQUIDS OR SOLIDS FROM GASES.

982,488.     Specification of Letters Patent.     Patented Jan. 24, 1911.

Application filed December 27, 1907. Serial No. 408,249.

*To all whom it may concern:*

Be it known that I, JOSEPH WILLARD GAMBLE, a citizen of the United States, and resident of and whose post-office address is No. 3251 North Sixteenth street, Philadelphia, Pennsylvania, have invented certain new and useful Improvements in Devices for Separating Liquids or Solids from Gases, of which the following is, taken in connection with the accompanying drawings, a full, clear, and concise description.

My invention relates particularly to that class of devices commonly called separators and has for its object the production of a form of separator that will effect a more efficient separation of the gases and liquids than is now possible with other known similar devices.

In all the present known forms of separators with which I am familiar, it has been customary to use a cylindrical form of pipe or inlet in juxtaposition to a baffle. In all of these devices it is necessary, in order to insure sufficient area for the passage of the steam, to allow a minimum distance between the end of the pipe or inlet and the baffle, equal to approximately one-fourth of the diameter of the orifice of the pipe or inlet. In instances where a corrugated or ribbed baffle is used, and to allow for friction, it is necessary to provide or allow even a greater distance than one-fourth the diameter of the orifice of the inlet. It is also necessary in these devices wherein a cylindrical orifice is employed to be careful that the distance between the orifice of the inlet and baffle be not too great, as in this event a cushion effect will be set up, which will hinder and retard separation.

It is the purpose of my present invention to overcome these defects, and in carrying my invention into practice, I have departed from the well-known circular or cylindrical form of orifice and provide an orifice of such shape and formation which will permit the lower end or lip of the orifice of the inlet being placed any minimum distance required from the baffle, irrespective of its area, and at the same time insure a proper distance between the orifice of the inlet and the baffle for the passage of the steam.

I have, in the accompanying drawings, illustrated one form of my said improved device for use in connection with a horizontal run of pipe, but it is manifest that the same can be adapted for use in connection with a vertical run of pipe without departing from my invention.

Referring to the accompanying drawings, in which like reference numerals indicate like parts throughout—Figure 1 is a sectional elevation of one form of my improved type of separator adapted for use in connection with a horizontal run of pipe. Fig. 2—a section on lines *a—a* in Fig. 1. Fig. 3 is a view looking toward the inlet or orifice next the baffle, with the baffle plate indicated in dotted lines.

Referring in detail in Figs. 1, 2 and 3, the separator comprises a shell of two parts or sections —1— and —4— suitably bolted together; section —1— being provided with an elongated inlet —1ª—, and section —4— with the cylindrical steam outlet —5—. Intermediate the inlet 1ª— and the outlet —5— is positioned the baffle plate —6— suitably bolted to the section —4— at —6ª—. This baffle is provided with suitable ribs or corrugations —7—. The lower portion of the inlet orifice is somewhat contracted or narrowed as indicated at —1ᵇ— and enlarged or widened at its upper portion as indicated at —1ª—. The inlet end —1ᶜ— is of the same area as the end —1ᵈ— next the baffle, which is elongated as shown. This construction and shape of the inlet is of particular advantage in devices of this character, since the liquid to be separated is of greater specific gravity and of considerably reduced volume and therefore requires less space or room than the steam which has been liberated. The precipitated liquid will run down the lower inclined surface of the inlet and drain off through outlet aperture —8— into any suitable receptacle, while the liberated steam or gas passes around the baffle through suitable openings —3ª— on either side, thence to and through the outlet —5—.

It will be seen that in a separator made in accordance with my present invention, the edge of the inlet orifice can be placed close to the baffle. This is very important, since by so doing the current will be prevented from retaining and carrying the liquid around the baffle, but it will be allowed to impinge the baffle to cause the desired separation, as would not be the case if the end of the inlet orifice were placed farther from the baffle. A further advantage of an orifice of this shape is that the particles being carried in the current are crowded together or caused to conglomerate before they impinge the surface of the baffle, at the point where separation occurs.

I would have it understood that I am not restricted to the particular specific form of separator here shown and described, but on the contrary, I would have it understood that my separator may be constructed in divers ways without departing from the spirit and scope of my invention.

Having thus described my invention, what I claim as new and desire to secure by Letters Patent is:

1. A separator containing a vertical baffle having side openings and a horizontal inlet pipe contracting in the horizontal plane and expanding in the vertical plane as it approaches toward the baffle, the distance between the inner edge of said inlet pipe and said baffle varying along the vertical diameter of the inlet pipe, substantially as described.

2. A separator having an inlet projecting into the separation chamber and having an interior orifice whose vertical axis is longer than its horizontal axis, and is retracted from the bottom upward; a baffle plate in such proximity to the inlet orifice as to leave a space between it and the orifice approximately equal to the area of the orifice, side openings in the baffle, and an outlet opposite the inlet, the edge of the interior orifice of the outlet projecting into the separation casing.

3. A separator having an inlet orifice, and a baffle having side openings, said orifice increasing in one dimension and decreasing in another dimension, the total area remaining approximately the same, and the edge being inclined toward the baffle.

4. A separator having a baffle provided with side openings and an inlet pipe contracting in one plane and expanding in another plane as it approaches toward the baffle, the distance between the inner edge of said inlet pipe and said baffle varying along the diameter of the inlet pipe, substantially as described.

5. A separator provided with a vertically arranged baffle having passages at its sides; an inlet increasing in its vertical dimension and decreasing in its transverse dimension toward the baffle, the total area throughout remaining the same, said inlet being disposed substantially opposite the median line of the baffle; and an outlet opposite the inlet.

Signed at Philadelphia in the county of Philadelphia and State of Pennsylvania this 24th day of December 1907.

JOSEPH WILLARD GAMBLE.

Witnesses:
JOSEPH M. HEWLETT,
D. J. HUNTER, Jr.